United States Patent [19]

Huelster et al.

[11] Patent Number: 4,565,483

[45] Date of Patent: Jan. 21, 1986

[54] MODULAR CONVEYOR CAR AND COUPLINGS THEREFOR

[75] Inventors: Richard L. Huelster, Indianapolis; Thomas A. Dyer, Greenwood, both of Ind.

[73] Assignee: Pentek Corporation, Indianapolis, Ind.

[21] Appl. No.: 380,085

[22] Filed: May 20, 1982

[51] Int. Cl.⁴ .............................................. B65G 67/00
[52] U.S. Cl. .................................. 414/353; 213/75 R; 280/460 R; 414/529
[58] Field of Search ............... 414/339, 353, 529, 499, 414/281; 198/574, 586, 584, 303; 213/75 R, 75 B, 86, 98, 188; 104/25, 139, 140; 180/79, 131; 280/400, 411 R, 489, 460 R

[56] References Cited

U.S. PATENT DOCUMENTS

| | | | |
|---|---|---|---|
| 1,433,924 | 10/1922 | Averill | 213/75 R |
| 1,529,510 | 3/1925 | Sanford | 213/75 B |
| 1,830,740 | 11/1931 | Leech et al. | 414/396 |
| 2,346,659 | 4/1944 | Bruce | 198/303 |
| 2,691,450 | 10/1954 | Rosenbaum | 414/499 |
| 2,879,884 | 3/1959 | Joy | 198/303 |
| 2,948,522 | 8/1960 | Moon | 198/303 X |
| 2,967,605 | 1/1961 | Stewart | 198/300 |
| 3,208,768 | 9/1965 | Hulbert | 280/460 R X |
| 3,294,420 | 12/1966 | Martin | 280/460 R X |
| 3,561,622 | 2/1971 | Dioguardi et al. | 414/339 |
| 3,561,625 | 2/1971 | Dioguardi | 198/584 |
| 4,239,253 | 12/1980 | Golze | 280/460 R |

FOREIGN PATENT DOCUMENTS 366973 4/1922 German Democratic Rep. .................................. 104/139

Primary Examiner—Robert J. Spar
Assistant Examiner—David A. Bucci
Attorney, Agent, or Firm—Barnes & Thornburg

[57] ABSTRACT

A conveyor car used in combination with one or more conveyors to transport loads from one conveyor to another includes modular end units, modular conveyor units, a rigid coupling for coupling end units to conveyor units and a hinge coupling for coupling the two conveyor units to each other. The hinge coupling allows the two conveyor units to pivot up and down near the center of the car but provides a rigid coupling to prevent horizontal movement of the conveyor units relative to each other.

8 Claims, 9 Drawing Figures

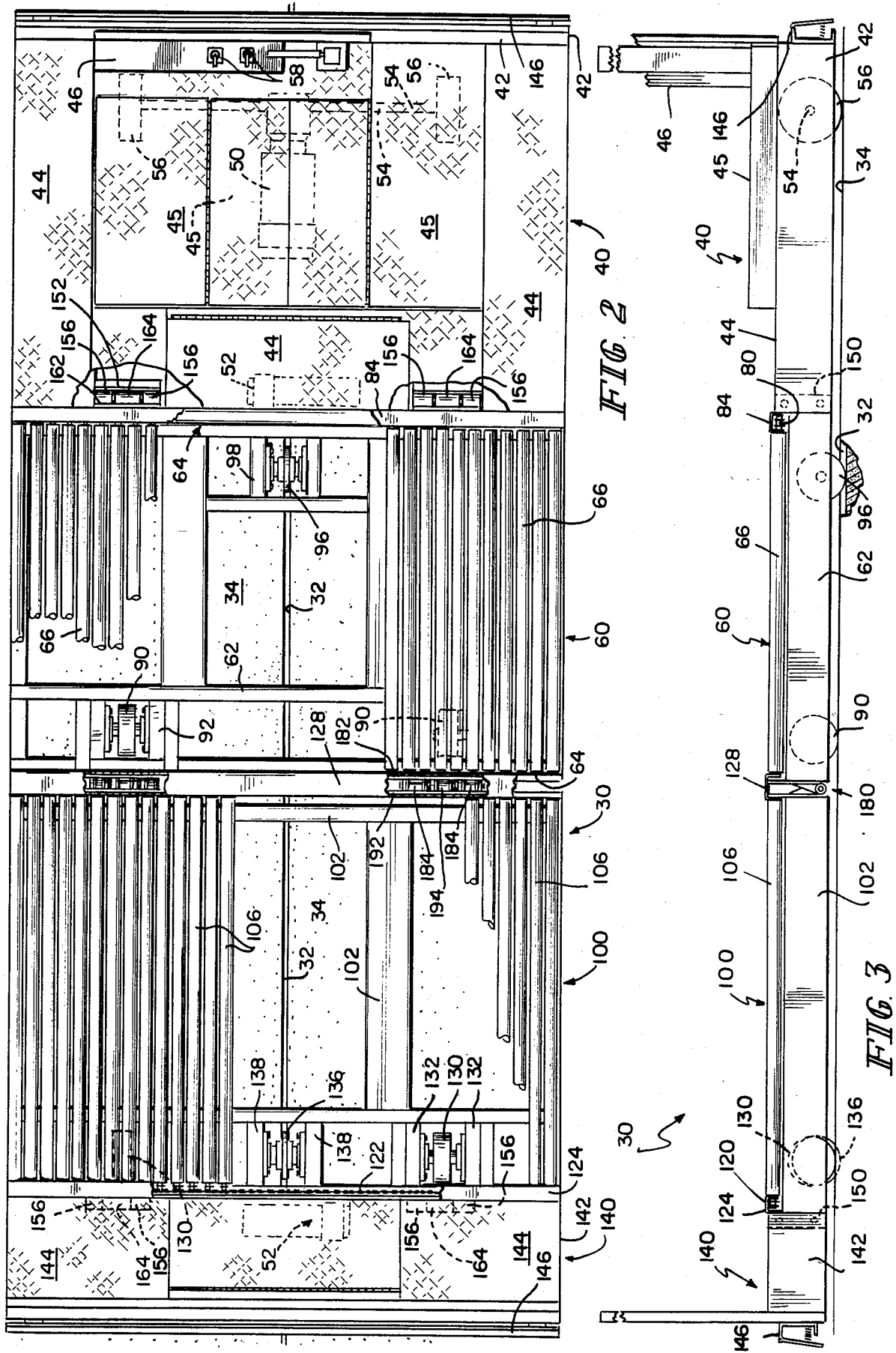

MODULAR CONVEYOR CAR AND COUPLINGS THEREFOR

The present invention relates to powered conveyor cars used in a conveyor system chain, and more particularly to car modules or sections and couplings thereof which increase the versatility, capability, and applicability of the conveyor car, while making it easier to ship and install.

Powered conveyor cars are well known to those skilled in the art. The conventional conveyor car includes end walk decks and means for supporting load-carrying rollers therebetween for rotation about axes which are generally transverse to the end decks. These conveyor cars are typically guided by wheels on the car which engage a rail in the floor of an industrial plant. The conveyor car is guided in a path in proximity to a series of conveyor systems. Thus, loads arriving at an end of one conveyor system can be conveyed onto the load-carrying rollers of the conveyor car and transported from the one conveyor system to another where the loads are then conveyed from the conveyor car to the other conveyor system.

Heretofore, the conveyor car has been manufactured as a single unit or a unibody frame with conveyors mounted thereon. It has been necessary to manufacture conveyor cars of various sizes, depending upon the particular application for the car. The cars could not be manufactured and assembled so that they could be easily adapted to produce cars of various sizes and capabilities, e.g., not easily expanded or added to.

Furthermore, once the car was manufactured as an integrated unit, it had to be shipped as a unit to the installation site and then installed as a unit. The conventional car structure has typically included a unibody frame with conveyors and deck panels separately mounted thereto so that the frame, conveyors and panels could be shipped in conventional trailers. The size of these units is many times very large. This creates shipping problems and makes it difficult to install the car at the installation site. A car manufactured for a particular application and then shipped and installed at the installation site cannot easily be changed or expanded by adding additional conveyor sections without a major modification to the car. Thus, the versatility of the car is basically limited to the particular application for which it was originally manufactured.

Since prior car designs have included a unibody frame structure with separate conveyor and deck units added thereto, the frame structure had to be massive to provide beam strength and support the weight of the loads. The massive structure for beam strength added to the shipping difficulties for large car sizes and required large drive packages to move the car because of its "dead weight."

Conveyor car wheels are typically one of the following three types: (1) wheels with flanges, e.g., railroad car style, engaging a track mounted on the surface of the floor; (2) wheels with flanges, e.g., railroad car style, engaging a track on the floor; and (3) polyurethane wheels engaging the floor surface in combination with a guide wheel in a channel in the floor. One other problem associated with the conventional conveyor car having three axles is that the wheels or guide wheels have a tendency to derail. Most floors of industrial plants are not level or they frequently include areas which are uneven. Most conveyor cars include ground-engaging wheels in addition to the guide wheel that rides along the channel or rail on the floor. If the ground-engaging wheels pass over an uneven floor surface area, the guide wheel will in some instances leave the track. This derailing may also occur with the other types of conveyor car wheels, particularly where the car has three axles. Operation of the conveyor system chain must be halted in order to reposition the guide wheel on the rail.

These problems and others related to conventional conveyor cars are solved by the conveyor car embodying the present invention. One of the objects of the present invention is to provide a conveyor car having modular sections which are independently coupled to each other in any desirable manner to adapt the car to one or more different applications.

Another object of the present invention is to provide a conveyor car which can be shipped in individual modular sections and installed at the installation site by coupling the modular sections together.

The present invention also eliminates derailing of the conveyor car by hinged couplings between one or more of the modular sections to allow flexural movement of the car in response to changes in the elevation of the floor surface. This flexibility also helps to maintain a vertical relationship between the conveyor car and the conveyor systems when the floor is uneven.

In accordance with these objects, a conveyor car includes standardized modular sections and hinged couplings which are adapted to produce cars of various sizes having various capabilities. Additional modular sections can be added or modular sections removed at the installation site to vary the capabilities and application of the conveyor car. Thus, the versatility of the conveyor car embodying the present invention is greatly increased.

In the illustrative embodiment, the conveyor car includes a modular drive assembly section, a modular conveyor section, a modular trolley conveyor section, and a modular rear deck section. The drive assembly section and the main conveyor section include means for rigidly coupling these two modular sections to each other. The main conveyor section and the trolley conveyor section include means for hingedly coupling these two modular sections to each other. Thus, the main and trolley conveyor sections are allowed to move vertically relative to each other. The trolley conveyor section and the rear deck section include means for rigidly coupling these two modular sections to each other. Additional conveyor sections may be hingedly or rigidly coupled between the main conveyor module and the trolley conveyor module, thereby to increase the number of conveyor sections associated with the conveyor car and increase its capabilities for flexibility and variety in use.

These and other advantages of the present invention will become apparent in view of the following detailed description of one embodiment thereof exemplifying the best mode of carrying out the invention as presently perceived, which description should be considered in conjunction with the accompanying drawings, in which:

FIG. 2 is a top elevational view, partly broken away, of the conveyor car embodying the present invention;

FIG. 3 is a side elevational view, partly broken away, of the conveyor car shown in FIG. 2;

Figure 1:
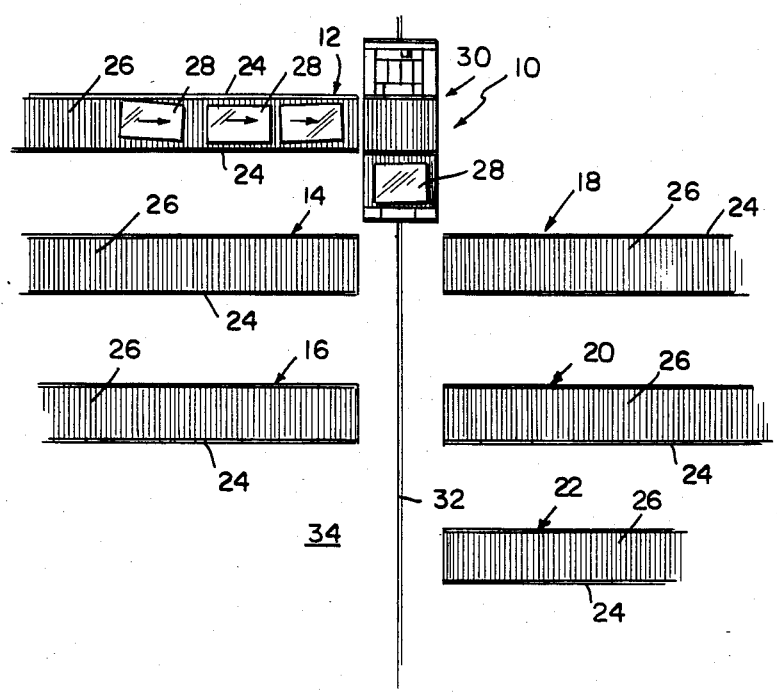
FIG. 1 is a diagrammatic view of a conveyor system chain showing a conveyor car embodying the present invention as a link in the system chain.

Referring to FIG. 1, an illustrative embodiment of a conveyor system chain 10 includes a plurality of individual conveyors 12, 14, 16, 20, and 22. Each conveyor in the conveyor system chain 10 includes one or more sections connected in end-to-end relationship to produce an elongated conveyor system. Each section includes side frame members 24 for supporting a plurality of load-carrying rollers 26 for rotation about transverse axes which are suitably spaced apart in the longitudinal direction of the conveyor system. The side frame members 24 may be constructed in any manner. For example, the side frame members 24 may be constructed in the manner disclosed in application Ser. No. 344,397, entitled SIDE FRAME ASSEMBLY FOR ROLLER CONVEYOR SYSTEMS, now U.S. Pat. No. 4,366,894, which is assigned to the same assignee as the present invention. Further, the conveyors 12, 14, 16, 18, 20, and 22 may include live rollers or gravity rollers which rotate in response to movement of loads 28 along the conveyor. The conveyors may also be accumulating or non-accumulating. In live conveyor systems, the rollers are powered in order to transport the loads from one end of the conveyor to the other. In conveyors where the rollers are not powered, the loads 28 move in response to gravity. In an accumulating live conveyor, driving power can be removed from a section of the conveyor to allow loads to accumulate on the section. The present invention is not intended to be limited to any particular type of conveyor system.

A powered conveyor car 30 embodying the present invention provides a link between the individual conveyor systems 12, 14, 16, 18, 20, and 22 of the chain 10 of conveyor systems. The conveyor car is powered between conveyors 12 through 22 and guided by a track or rail 32 on the floor 34 of an industrial plant. The wheels and guidance system of the car 30 may be any one of the three conventional types previously described without affecting the scope of the present invention. The conveyor car 30 is operable in a space between ends of the conveyor system 12 through 22, and loads 28 are pushed or transported onto the conveyor car 30. The loads 28 are transported by the conveyor car from one conveyor system 12 to any one of the other conveyor systems 14 through 22 and transported from the car conveyor 30 onto the other conveyor system. The cars 30 can be controlled by an operator or powered automatically. Heretofore, conveyor cars have been constructed as a unit, thus limiting their versatility and capability and making them difficult to ship and install. A conveyor car 30 embodying the present invention includes a plurality of modular sections which are coupled together at the installation site. Thus, the conveyor car 30 can be shipped in individual modular sections. Modular sections can be removed or added at the installation site to vary the car size and its capability for various applications.

Referring to FIGS. 2 and 3, the conveyor car 30 includes a modular drive assembly and front deck section 40 having a frame structure 42 for supporting a plurality of walk plates on a lower deck 44 and a plurality of walk plates on an upper deck 45. An electrical panel enclosure 46 is carried on the upper deck 45 and includes the control system for operating the conveyor car 30.

The frame structure 42 supports a drive motor 50 near the front of the modular section 40 and a brake gear motor 52 in proximity to the rear of the modular section 40. As will be explained later, brake gear motor 52 is used to propel the load-carrying rollers of a main conveyor section of the car 30. A drive axle 54 is coupled to the drive motor 50. Two wheels 56, each having an outside diameter of 12 inches, are mounted to the drive axle 54 in spaced-apart relationship. A control mechanism 58 may be provided for an operator who stands on the upper deck 45 of the modular section 40. If the modular drive assembly section is automatically powered, the control mechanism 58 may be eliminated, although in most instances the control mechanism 58 is present in automatic cars also. Only two wheels 56 support the drive assembly module 40, and they are positioned in proximity to the front of the module 40.

A modular main conveyor section 60 is coupled to the rear of the drive assembly module 40 in a manner which will be explained later. The main conveyor section 60 includes a frame structure 62 which supports two elongated side frame members 64 in spaced parallel relationship transverse to the longitudinal dimension and direction of movement of the conveyor car 30. The side frame members 64 support a plurality of load-carrying rollers 66 for rotation about shafts 68 which are suitably spaced apart in a direction transverse to the longitudinal dimension of the conveyor car 30. Thus, loads can be transported over rollers 66 in a direction transverse to the direction of movement of the conveyor car 30.

Figure 4:
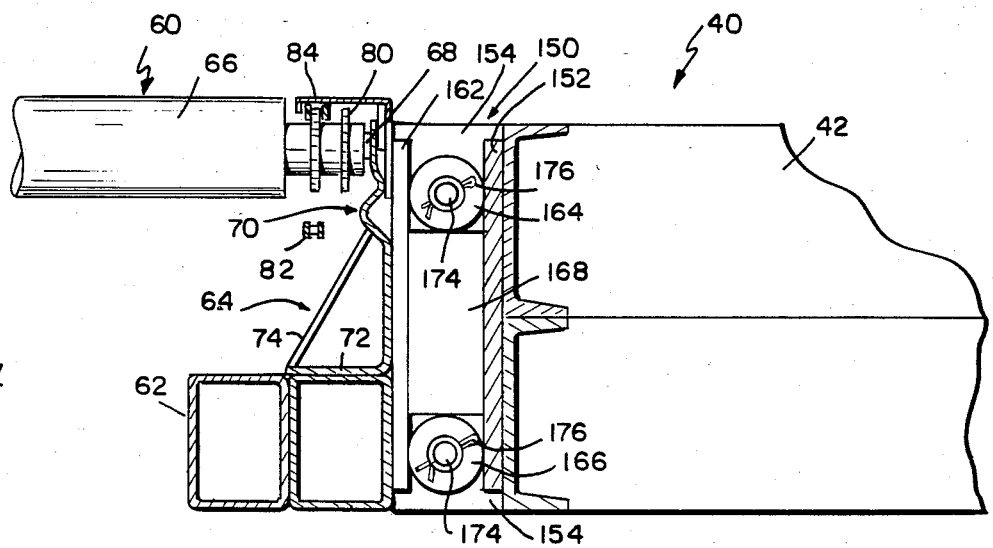
FIG. 4 is a sectional view, partly cross-sectioned, of the conveyor car of FIGS. 2 and 3 showing the details of a coupling between modular sections of the conveyor car.

As best shown in FIG. 4, a preferred embodiment of the side frame members 64 includes a rigid profiled upright rail 70 having a generally L-shaped cross section which is elevated in spaced relationship to the floor 34 by the frame structure 62. The rail 70 has a horizontal flange portion 72 which is connected to the frame structure 62. The profiled rail 70 is reinforced by an inclined reinforcement member 74. The preferred embodiment of the side frame member is more particularly disclosed in application Ser. No. 344,397 entitled SIDE FRAME ASSEMBLY FOR ROLLER CONVEYOR SYSTEMS, now U.S. Pat. No. 4,366,894, which is assigned to the same assignee as the present invention. It will be appreciated that other side frame structures can be used without departing from the scope of the present invention.

Drive sprockets 80 are coupled to the load-carrying rollers 66. One or more chains engage the sprockets 80 and are driven by a shaft connected to the brake gear motor 52 in the drive assembly module 40. A chain cover 84 is placed over the sprockets 80 and chain 82 and is removable to allow access to the sprockets 80 or chain 82. The cover 84 serves to protect the sprockets 80 and chain 82 and to also prevent material from becoming caught in the sprockets 80 or chain 82.

As best shown in FIG. 2, wheels 90 having outside diameters of approximately 9 inches are rotatably mounted to the frame structure 62 by brackets 92. Wheels 90 are freely rotatable and are spaced apart in proximity to the rear of the main conveyor module 60.

In the illustrative embodiment, a guide wheel 96 is rotatably mounted to the frame structure 62 by brackets 98. Guide wheel 96 is also freely rotatable and is mounted in proximity to the front of the main conveyor module 60. The guide wheel 96 is centrally located with respect to the lateral edges of the conveyor car 30 and engages track 32 in the floor 34 of the industrial plant to guide the movement of the conveyor car 30 in a predetermined path between the conveyor systems 12 through 22 of the chain 10. Other wheel and guidance packages may be used without departing from the scope of the present invention.

Figure 7:
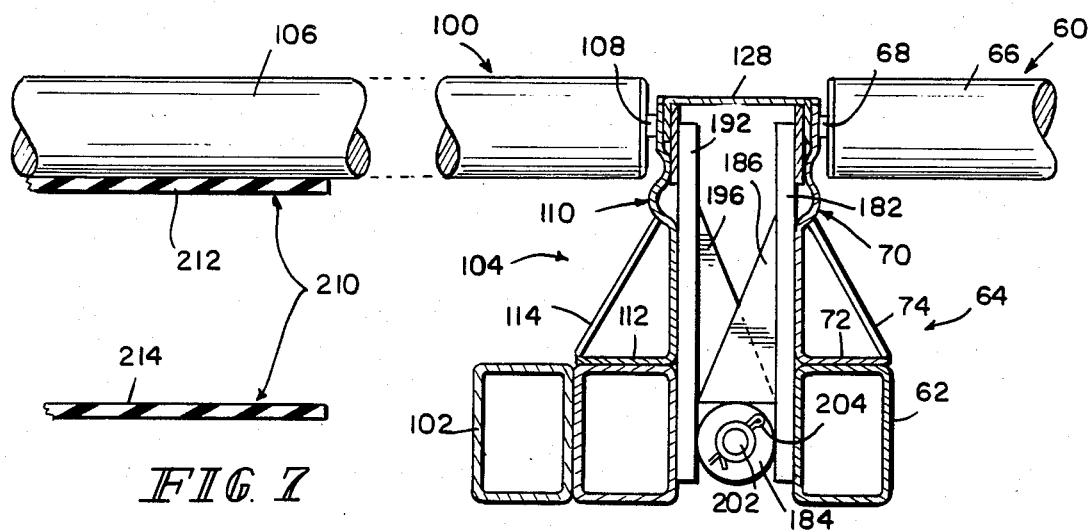
FIG. 7 is a sectional view, partly cross-sectioned and broken away, of the car conveyor of FIGS. 2 and 3 showing the details of another coupling between modular sections of the conveyor car.

A modular trolley or second conveyor section 100 is coupled to the rear of the main conveyor module 60 in a manner which will be explained later. The trolley conveyor module 100 includes a frame structure 102 of similar construction as frame structure 62 of the main conveyor module 60. As best shown in FIGS. 2 and 7, two elongated side frame members 104 are mounted on the frame structure 102 in spaced parallel relationship transverse to the longitudinal dimension and direction of movement of the conveyor car 30. The side frame members 104 support a plurality of load-carrying rollers 106 for rotation about shafts 108 which are suitably spaced apart in a direction transverse to the longitudinal dimension of the conveyor car 30. Thus, loads 28 can be transported over rollers 106 in a direction transverse to the direction of movement of the conveyor car 30.

As best shown in FIG. 7, a preferred embodiment of the support members 104 includes a rigid profiled upright rail 110 having a generally L-shaped cross section and having a structure identical to the side frame members 64 of the main conveyor module 60. Each side frame member 104 has a horizontal flange 112 connected to the frame structure 102. The rail 110 is reinforced by an inclined reinforcement member 114. As before, it will be appreciated that while the preferred embodiment for side frame members 104 is that disclosed in application Ser. No. 344,397, entitled SIDE FRAME ASSEMBLY FOR ROLLER CONVEYOR SYSTEMS, now U.S. Pat. No. 4,366,894, other side frame member structures may be used without departing from the scope of the present invention.

Referring to FIGS. 2 and 3, a plurality of drive sprockets 120 are connected to the load-carrying rollers 106 and are engaged by a chain drive 122 to propel the rollers 106. The chain 122 is driven by a shaft connected to a brake gear motor 52 supported on a modular rear deck assembly 140. A chain cover 124 protects the sprockets 120 and chain 122, and prevents material from becoming entangled in the sprockets 120 and chain 122. A coupling cover 128 is also provided between the main conveyor module 60 and the trolley conveyor module 100 to prevent material from slipping between the two modular sections 60 and 100.

Wheels 130 having outside diameters of approximately 9 inches are rotatably mounted to the frame structure 102 in proximity to the rear of the trolley conveyor module 100 by brackets 132. Wheels 130 are spaced apart and freely rotatable.

A guide wheel 136 is rotatably mounted to the frame structure 102 by brackets 138. Guide wheel 136 is positioned between the wheels 130 and is aligned with the guide wheel 96 of the main conveyor module 60. Guide wheel 136 is freely rotatable and centrally located to engage the track 32 in the floor 34 to guide the car conveyor 30 in its predetermined path transverse to the conveyor system 12 through 22 of the conveyor system chain 10.

A modular rear deck assembly section 140 is coupled to the rear of the trolley conveyor module 100 in a manner which will be explained later. The rear deck assembly module 140 includes a frame structure 142 for supporting a plurality of walk plates 144 forming a rear deck. The frame structure 142 also supports a brake gear motor 52 which is connected to a shaft (not shown) for driving the sprockets 120 and chain 122 to propel the load-carrying rollers 106 of the trolley conveyor module 100.

Both the drive assembly module 40 and the rear deck assembly module 140 have end bumper assemblies 146 which are spring-actuated against a switch (not shown) for automatically shutting off the car when it makes contact with obstacles in the car's path of movement.

Referring to FIGS. 2, and 4–6, rigid couplings 150 embodying the present invention couple the drive assembly module 40 to the main conveyor module 60, and the rear deck assembly module 140 to the trolley conveyor module 100. Two couplings 150 are used between the modular sections 40 and 60 and two are used between the modular sections 100 and 140. Each rigid coupling 150 includes a plate 152. Plates 152 are mounted to the frame structures 42 and 102 of the drive assembly module 40 and the trolley conveyor module 100, respectively. On the drive assembly module 40, the plate 152 is mounted in openings 154 provided in the rear of the drive assembly module 40. This is best shown in FIGS. 2 and 4.

Figure 5:
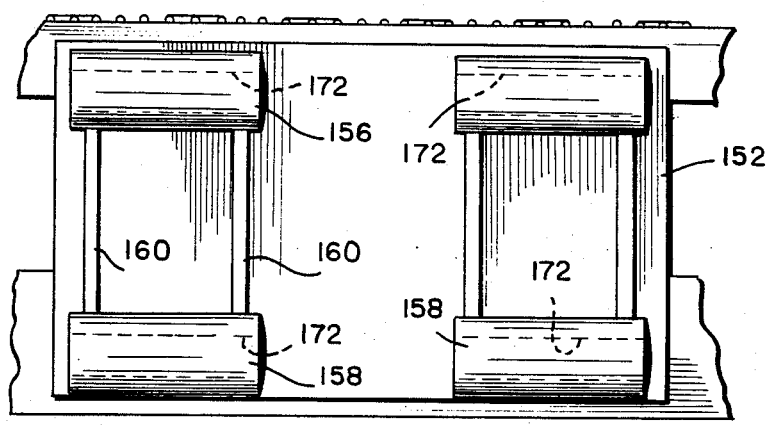
FIG. 5 is a front elevational view of one-half of the coupling shown in FIG. 4.

Referring more particularly to FIG. 5, two upper coupling members 156 and two lower coupling members 158 are mounted to the plate 152 with vertical brackets 160 provided for structural strength. Coupling members 156, 158 and brackets 160 are secured to the plate by means such as welding. Other means for securing the members 156, 158, and 160 could be used without departing from the scope of the present invention. The upper and lower coupling members 156 and 158, respectively, are spaced apart a distance which is generally equivalent to the length of one of the coupling members 156, 158. In the preferred embodiment, each coupling member 156, 158 has a generally tubular shape and includes a bore or channel 172 extending axially therethrough. Channels 172 in the upper members 156 and channels 172 in the lower members 158 are aligned, respectively.

Figure 6:
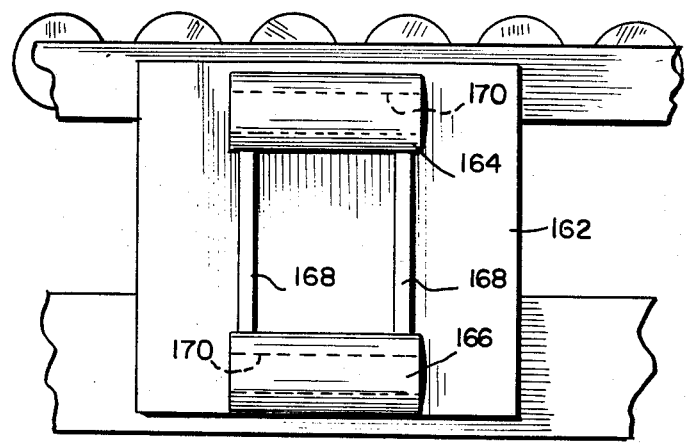
FIG. 6 is a front elevational view of the other one-half of the coupling shown in FIG. 4.

Referring particularly to FIGS. 4 and 6, each rigid coupling 150 also includes a plate 162. Plates 162 are mounted to the frame structures 62 and 142 of the main conveyor module 60 and rear deck assembly module 140, respectively. On the rear deck assembly module 140, the plate 162 is mounted in openings (not shown) provided in the front of the module 140. An upper coupling member 164 and a lower coupling member 166 are mounted to the plates 162 by brackets 168. The coupling members 164, 166 and brackets 168 are secured to the plates 162 by means such as welding. Other securing means may be used without departing from the scope of the present invention. The upper and lower coupling members 164 and 166 each include a bore or channel 170 extending axially therethrough. Plates 162 are mounted in predetermined positions relative to frame structures 62 and 142 so that when the main conveyor module 60 is placed in end-to-end relationship to the drive assembly module 40, the upper and lower coupling members 164 and 166 are received in the space between the upper and lower coupling members 156 and 158. Thus, channels 170 and 172 are aligned when modules 40 and 60 are placed in end-to-end relationship. Posts 174 are inserted through the channels 170 and 172 and retained therein by retaining pins 176 to provide a rigid coupling between the drive assembly module 40 and main conveyor module 60 and between the trolley conveyor module 100 and the rear deck assembly module 140.

As shown in FIGS. 2, and 7-9, hinged couplings 180 embodying the present invention couple the main conveyor module 60 to the trolley conveyor module 100 to allow vertical movement of the modules 60 and 100 relative to each other. Two couplings 180 are used between the modular sections 60 and 100 to prevent horizontal movement of the modules 60 and 100 relative to each other.

Figure 8:
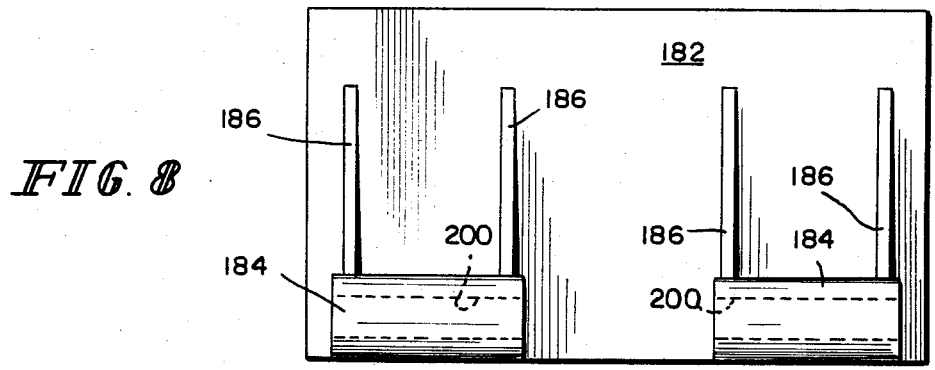
FIG. 8 is a front elevational view of one-half of the coupling shown in FIG. 7.

Referring particularly to FIGS. 7 and 8, each hinged coupling 180 includes a plate 182. Plate 182 is mounted to the frame structure 62 of the main conveyor module 60. Two coupling members 184 are mounted to the plate 182 in spaced-apart relationship with brackets 186 provided for structural strength. The two coupling members 184 and brackets 186 are secured to the plate 182 by means such as welding. Other securing means may be used without departing from the scope of the present invention. The coupling members 184 are spaced apart a distance generally equal to the length of one of the coupling members 184. As best seen in FIG. 8, the coupling members 184 are mounted in proximity to the lower edge of the plates 182. In the preferred embodiment, the coupling members 184 are generally tubular in shape, and each includes a bore or channel 200 extending axially therethrough.

Figure 9:
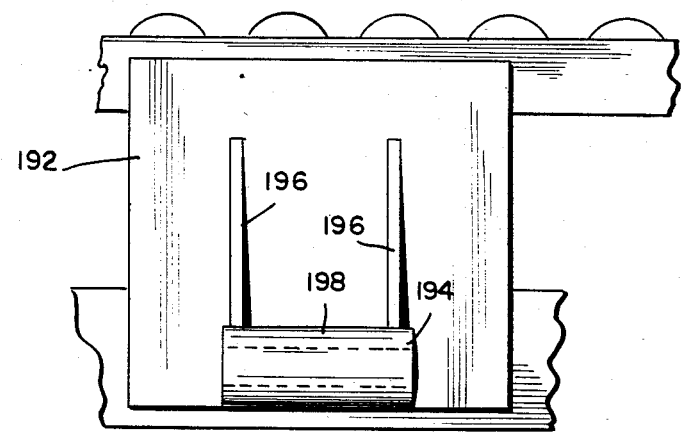
FIG. 9 is a front elevational view of the other one-half of the coupling shown in FIG. 7.

Referring particularly to FIGS. 7 and 9, each hinged coupling 180 also includes a plate 192. Plate 192 is mounted to the frame structure 102 of the trolley conveyor module 100. A coupling member 194 is mounted to the plate 192 with brackets 196 provided for structural strength. Coupling member 194 and brackets 196 are secured to the plate 192 by means such as welding. Other securing means may be used without departing from the scope of the present invention. In the preferred embodiment, coupling member 194 is generally tubular in shape and includes a bore or channel 198 extending axially therethrough.

When the main conveyor module 60 is placed in end-to-end relationship to the trolley conveyor module 100, the coupling member 194 fits in the space between the coupling members 184. Channels 198 and 200 are aligned. A post 202 is inserted through the channels 198 and 200 and retained therein by retaining pins 204. Thus, it will be appreciated that main conveyor module 60 is flexible relative to the trolley conveyor module 100 in a hinged fashion so that the conveyor car 30 flexes in response to changes in elevation of the floor 34. This flexural movement prevents derailing of the guide wheels 96 and 36 as a result of unevenness of the floor 34. The flexural feature is particularly advantageous where the car includes three axles, i.e., six wheels.

As previously described, both the main conveyor module 60 and trolley conveyor module 100 include load-carrying rollers 66 and 106 which are propelled to transport loads 28 from one lateral edge of the conveyor car 30 to the other. Thus, each conveyor module 60 and 100 includes live rollers, and each is independently operable for transporting loads over the load-carrying rollers 66 and 106 in directions transverse to the longitudinal dimension of the conveyor car 30 and the direction of its movement.

Referring to FIG. 7, an alternative means for driving the load-carrying rollers 66 and 106 includes an endless belt 210. The belt 210 has an upper driving pass 212 in frictional contact with the load-carrying rollers 66 and 106 and a lower idler pass 214. The belt 210 is driven by a drive motor (not shown) located at one end of the conveyor module 60 and 100 adjacent to one lateral edge of the conveyor car 30 and a take-up assembly (not shown) located at the other end of the conveyor module 60 and 100 adjacent the other lateral edge of the conveyor car 30. Belt 210 passes over pressure rollers (not shown) which press the upper pass 212 of the belt 210 against the load-carrying rollers 66 and 106. The lower or idler pass 214 of the belt 210 engages idler rollers (not shown) supported by the frame structure 62 and 102 of the conveyor modules 60 and 100, respectively. It will be appreciated that other drive mechanisms can be employed for driving the load-carrying rollers 66 and 106 of the conveyor modules 60 and 100 without departing from the scope of the present invention.

While embodiments exemplifying the best mode for carrying out the invention as presently perceived have been described, various modifications may be made to these embodiments without departing from the scope of the present invention.

What is claimed is:

1. A powered conveyor car guided by a track along a surface comprising first, second, and third modular units, at least one of the second and third units being a modular conveyor unit, at least three wheel and axle assemblies engaging the surface to support the first, second, and third modular units, first drive means in the first modular units for moving the car, guide means for engaging the track to determine a path of movement for the car, the conveyor unit including side frame members in spaced relationship for supporting a plurality of load-carrying rollers for transporting loads in a direction generally transverse to the path of movement of the car, second drive means for propelling the load-carrying rollers to transport the loads from one lateral edge to the other lateral edge of the car, first coupling means for coupling the second modular unit to the first modular unit, and second coupling means for coupling the second modular unit to the third modular unit, whereby the modular units are separable for shipping, installation and addition of modular units, one of the first and second coupling means including a hinge connecting means having only a single generally horizontal hinge axis to permit coupled modular units to move hingedly with respect to each other so that the guide means will follow the track when the surface engaged by the wheel and axle assemblies is uneven.

2. The conveyor of claim 1, comprising a fourth modular unit and third coupling means for coupling the fourth modular unit to the third modular unit and wherein both the second and third modular units are conveyor units, the second coupling means coupling the two conveyor units to each other.

3. The conveyor car of claim 2 wherein the first and third coupling means include rigid connecting means for providing a rigid connection between the conveyor units and the first and fourth modular units.

4. The conveyor car of claim 3 wherein the second coupling means includes two hinge connecting means for providing a flexible connection between the two conveyor units.

5. The conveyor car of claim 1 wherein the hinge connecting means includes first and second coupling members secured to one of the second and third modular units in horizontally spaced-apart, end-to-end relationship, the first and second coupling members including channels extending axially therethrough in alignment with each other, a third coupling member horizontally secured to the other of the second and third modular units, the third coupling member including a channel extending axially therethrough, the third coupling member fitting into the space between the first and second coupling members so that the channels of the three coupling members are aligned to provide the horizontal hinge axis, and retaining means inserted through the three channels.

6. In a conveyor system including a conveyor having side frame members supporting a plurality of load-carrying rollers for rotation about transverse axes spaced apart in a longitudinal direction to transport loads from an upstream end to a downstream end, a track adjacent to one of the upstream and downstream ends and generally transverse to the longitudinal direction of the conveyor, and a powered conveyor car guided by the track and movable along a surface transverse to the longitudinal direction of the conveyor, the improvement wherein the conveyor car comprises at least one modular end unit, at least two modular conveyor units, at least three wheel and axle assemblies engaging the surface to support the end unit and the conveyor units, first drive means in the end unit for moving the car, guide means engaging the track to define a path of movement for the car, the conveyor units including side frame members in spaced relationship for supporting a plurality of load-carrying rollers for transporting loads in the longitudinal direction of the conveyor, second drive means for propelling the load-carrying rollers of the conveyor units to transport loads from one lateral edge to the other lateral edge of the car, first coupling means for coupling the end unit to one of the conveyor units to allow separation of the conveyor units from the end unit for shipping, installation, and addition of conveyor units, and second coupling means for coupling the conveyor units to each other to allow separation thereof, the second coupling means including a hinge connecting means having only a single generally horizontal hinge axis to permit the coupled conveyor units to move hingedly with respect to each other so that the guide means will follow the track and the load-carrying rollers of the conveyor units will be generally even with load-carrying rollers of the conveyor when the surface is uneven.

7. A powered conveyor car guided by a track along a floor surface, comprising first and second modular end units, at least two modular conveyor units between the modular end units, at least three wheel and axle assemblies engaging the surface to support the end units and conveyor units, first drive means in one of the first and second end units for moving the car, guide means for determining a path of movement for the car, each conveyor unit including side frame means in spaced relationship for supporting a plurality of load-carrying rollers for conveying loads in a direction generally transverse to the path of movement of the car, second drive means for propelling the load-carrying rollers to convey the loads from one lateral edge to the other lateral edge of the car, first rigid coupling means for coupling a first conveyor unit to the first end unit, a hinge coupling means for coupling the first conveyor unit to a second conveyor unit to allow the conveyor units to pivot up and down relative to each other about only a single horizontal hinge axis, and a second rigid coupling means for coupling the second conveyor unit to the second end unit whereby the modular units are separable for shipping and installation.

8. A conveyor car comprising
a plurality of modular units including a drive unit and at least two conveyor units,
at least three load-bearing wheel and axis assemblies in engagement with a floor to support the modular units,
a guide wheel for engaging one of a channel in the floor or a track mounted on the floor to guide the conveyor car along a path,
the drive unit including car drive means for moving the car,
at least one of the conveyor units including side frame members in spaced relationship for supporting a plurality of load-carrying rollers for transporting loads in a direction generally transverse to the path of movement of the car,
roller drive means for propelling the load-carrying rollers to transport the loads from one lateral edge to the other lateral edge of the car,
rigid coupling means for rigidly interconnecting the drive unit and one of the conveyor units, and
hinge coupling means for interconnecting at least one pair of adjacent conveyor units in horizontally spaced-apart end-to-end relation to permit at least one conveyor unit to move in relation to its adjacent conveyor unit about only a single horizontal pivot axis during transit of the conveyor car so that the guide wheel will follow said one of the channel and track without substantial interruption when the floor engaged by the three wheel and axle assemblies is uneven.

* * * * *